United States Patent [19]

Oliver et al.

[11] 3,867,618

[45] Feb. 18, 1975

[54] DYNAMIC POWER SUPPLY TEST SYSTEM

[75] Inventors: Burton L. Oliver, Endicott; Wayne R. Sitler, Endwell, both of N.Y.

[73] Assignee: International Business Machines Corporation, Armonk, N.Y.

[22] Filed: June 25, 1973

[21] Appl. No.: 373,539

[52] U.S. Cl. ................... 235/153 AC, 324/73 AT
[51] Int. Cl. .................................. G06f 11/00
[58] Field of Search ...... 235/153 A, 153 AC, 151.3, 235/151.31, 153 R; 324/73 R, 73 AT, 103 R, 52; 340/253 R, 253 A, 172.5; 328/146–149; 317/9 AC

[56] References Cited
UNITED STATES PATENTS

| | | | |
|---|---|---|---|
| 3,564,528 | 2/1971 | Drushel | 340/253 R X |
| 3,706,007 | 12/1972 | Yung-Chun Wu | 340/253 A X |
| 3,715,573 | 2/1973 | Vogelsberg | 235/153 AC |
| 3,745,316 | 7/1973 | Olah | 235/153 A |
| 3,761,695 | 9/1973 | Eichelberger | 235/153 AC |

Primary Examiner—Malcolm A. Morrison
Assistant Examiner—Jerry Smith
Attorney, Agent, or Firm—John C. Black

[57] ABSTRACT

A test system is connected to power supply means in a data processing system to detect and locate faults which occur due to power supply loading conditions. The data processing system has several functional units, each of which is powered by separate power supply means. The test system which is connected to and monitors the output of each of the power supply means includes filtering means for separating high frequency components from low frequency components, positive and negative polarity level detection means for the high frequency components and for the low frequency components and direct current positive and negative threshold detectors. When the system is in the power test mode, the outputs from the level and threshold detectors are gated to voltage status registers which are periodically interrogated by the data processing system to determine if a fault has occurred due to power supply loading conditions.

5 Claims, 2 Drawing Figures

DYNAMIC POWER SUPPLY TEST SYSTEM

BACKGROUND OF THE INVENTION

1. Field of the Invention

The present invention relates to test systems and more particularly to test systems for exercising the monitoring electronic power supply means.

2. Prior Art

In the prior art, the exercising and monitoring of electronic power supplies is normally done on a static basis. That is, certain loading conditions are applied and meters or oscilloscopes are used to monitor the characteristics of the power supplies.

Many power supply faults are not discovered during static testing. An oscilloscope, while providing a useful indication of output characteristic of a power supply, is a manually operated device which is very cumbersome and time-consuming to operate. Further, there are many situations in which an adequate display cannot be achieved on the oscilloscope screen due to error repetition rate or intermittent faults.

SUMMARY OF THE INVENTION

Therefore, it is a primary object of the present invention to dynamically exercise and monitor power supply means by a test system which applies predetermined load conditions and monitors outputs of the power supply means.

It is another object of the present invention to dynamically exercise and monitor the outputs of power supply means by a test system which additionally includes means for monitoring the alternating current characteristics of the power supply means, means for monitoring the direct current characteristics of the power supply means, and means for storing digital indications of the condition of the power supply means.

It is a further object of the present invention to test a power supply system by a test system which includes a diagnostic microprogram which produces predetermined loading conditions on the power supply system, the outputs of which are monitored by a group of monitor devices which produce digital representations for each characteristic of the power supply system.

Accordingly, to exercise and monitor power supply means in a data processing system, apparatus according to the present invention includes microprogram control means for operating the data processing system to cause the power supply means to be presented with a predetermined loading condition, means connected to the power supply means for separating high frequency alternating current portions of the power supply output from low frequency alternating current portions of the power supply output, positive and negative level detecting means connected to the separating means for detecting the magnitude in both positive and negative directions of the high frequency and low frequency components, positive and negative direct current threshold detectors for monitoring the direct current characteristics of the power supply means, and storage means for storing information from the level and threshold detectors representative of the status of the power supply system.

It is an advantage of the present invention that preventative maintenance may be performed on power supplies for the various functional units of a data processing system to predict failure conditions and reduce the number of failures due to power supply loading which might occur during the running of an application program.

It is another advantage of the present invention that when power system failures occur, the monitoring system of the present invention reduces the downtime of the system and aids in troubleshooting the failure.

These and other objects, features and advantages of the present invention will become more apparent from the following more particular description of a preferred embodiment of the invention as illustrated in the accompanying drawing.

PATENTS INCORPORATED BY REFERENCE

U.S. Pat. No. 3,585,599 to Donald C. Hitt, entitled *Universal System Service Adapter* and U.S. Pat. No. 3,651,476 to Thomas A. Metz, et al., entitled *Processor with Improved Controls for Selecting an Operand from a Local Storage Unit, an ALU Output Register or Both* are hereby incorporated by reference in their entirety as prior art teachings for a data processing system with which the test system of the present invention could be used.

DETAILED DESCRIPTION OF THE INVENTION

Figure 1:
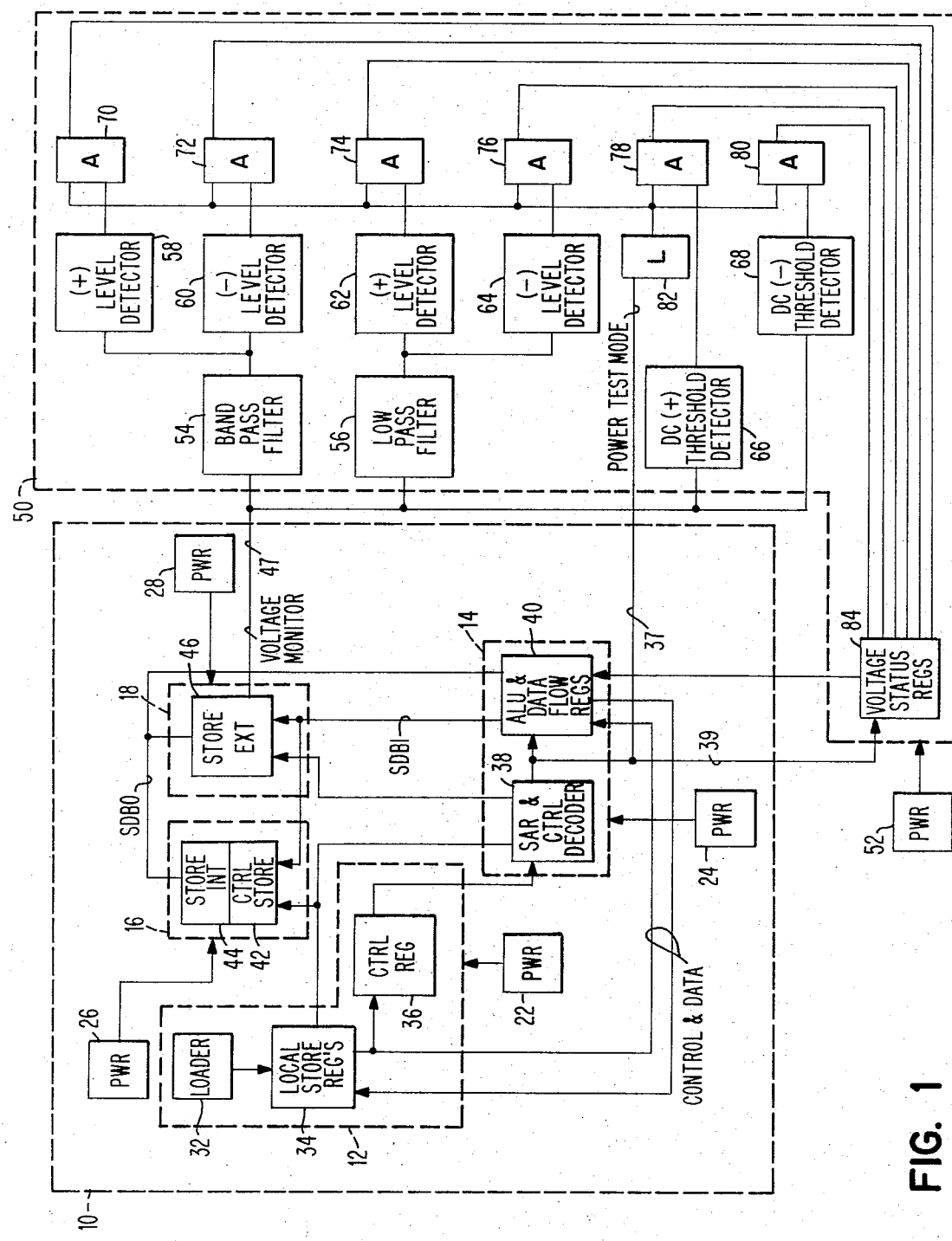
FIG. 1 is a schematic block diagram showing the interconnections of apparatus embodying the present invention.

Referring now to FIG. 1, data processing system 10 includes several functional units 12, 14, 16 and 18, each having separate power supply means, 22, 24, 26 and 28 respectively. Data processing system 10 may be implemented as taught in the referenced U.S. Pat. No. 3,651,476 to Metz, et al.

Functional unit 12 includes microprogram loader means 32, local storage register 34 and control register 36.

Functional unit 14 includes storage address register and control decoder 38 and arithmetic logic unit and data flow registers 40.

Functional unit 16 includes control storage 42 and internal main store 44.

Functional unit 18 includes external data storage 46. The dynamic test system 50 has power supplied to it from power supply means 52 which is independent of the power supply means 22, 24, 26 and 28 which are the subject of the test to be performed.

It should be understood that although a single block is shown for each power supply means 22, 24, 26, 28, these blocks represent several physical units to supply the plurality of voltages required to operate a data processing system.

Dynamic test system 50 includes band pass filter 54 which passes frequency components between 1 and 20 megahertz, low pass filter 56 which passes frequency components between zero and 1 megahertz, positive and negative level detectors 58 and 60 connected to the output of band pass filter 54, positive and negative level detectors 62 and 64 connected to the output of low pass filter 56 for producing an output signal when the respective outputs of the band pass filter 54 and low pass filter 56 exceed a predetermined value in either the positive or negative direction. Dynamic test system 50 also includes positive and negative DC threshold detectors 66 and 68 for monitoring the amplitude of the direct current component of the power supply under test.

The outputs of the respective level and threshold detectors are connected each to one of a group of AND circuits 70 through 80 respectively. The outputs of AND circuits 70, 72, 74, 76, 78 and 80 are connected to inputs to voltage status registers 84.

FIG. 1 shows voltage monitor line 47 connecting external storage 46 to the inputs of filters 54, 56 and DC threshold detectors 66 and 68 in dynamic power test system 50. It should be understood that although a single line 47 is shown and a single dynamic power test system 50 is shown, for a completely automated test system, there may be a voltage monitor line for each power supply serving each functional unit in data processing system 10. Alternatively, dynamic test system 50 may be switched from one functional unit to the next for a sequenced testing of all power supply means in data processing system 10.

Voltage monitor line 47 serves as the input to the test system 50. Another required input to operate the test system is power test mode line 37 from the control decoder 38. Power test mode line 37 when active sets latch 82 which enables AND circuits 70 through 80 to gate the voltage status information to registers 84.

Line 39 from control decoder 38 provides a gating signal to enable voltage status information to be transmitted to the arithmetic logic unit and data flow 40 for examination of fault conditions.

While all the elements of FIG. 1 are shown in the form of a block diagram, it is to be understood that each block consists of circuits which are well known in the prior art and need not be described in greater detail in this application.

OPERATION

Figure 2:
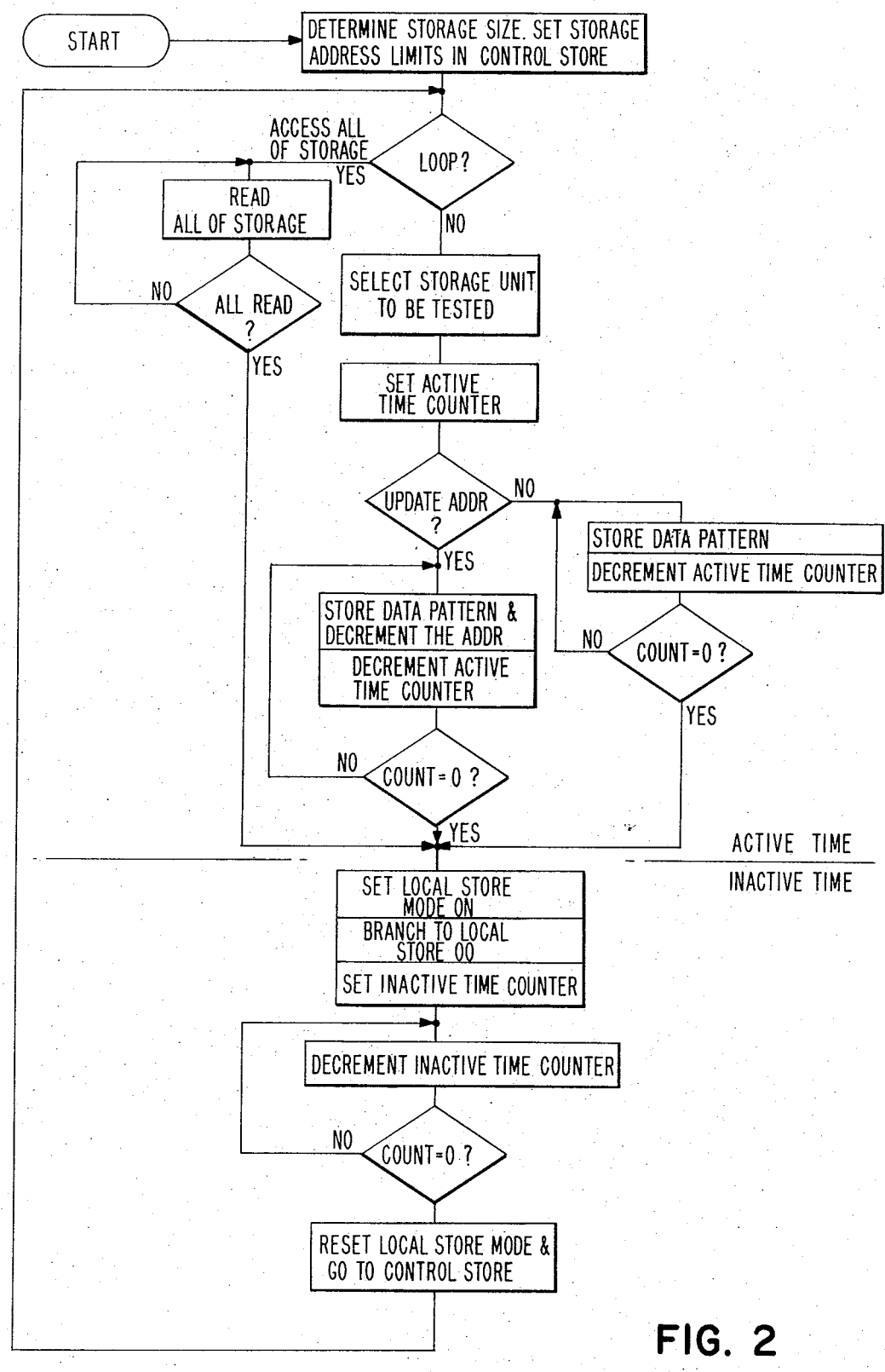
FIG. 2 is an operational flow chart showing the steps to be executed for exercising and monitoring a storage power supply system according to the present invention.

Referring now to FIG. 2, the operation of the dynamic power supply test system will be described. The power supply means, 22, 24, 26 and 28 shown in FIG. 1 are exercised by microprogram control of the operation of the data processing system. The microprogram activates the maximum amount of circuitry within the functional unit to be exercised to present the worst-case load on the power supplies. The length of time called active time during which the maximum worst-case loading is applied to the power supplies of a functional unit is controlled by the settings of switches on the operator console of data processing system 10. These switches set a register in control storage 42. This register then is operated as a counter to control active time.

FIG. 2 shows the microprogram which is used to exercise external storage 46 and thus test power supply means 28.

ACTIVE TIME

The storage size is determined and console switches are set into control store 42 indicating storage address limits.

The microcontrol word is interrogated to determine whether the entire storage array is to be accessed or whether one particular storage unit is to be accessed. If all of storage is to be accessed, a branch is taken to read all of storage and loop within that branch until all the storage has been read out. At that point, the active time portion of the test is terminated and the inactive time portion is begun.

If, however, all of storage is not to be accessed, the particular storage unit to be accessed is selected either from the settings of a group of console switches or alternatively from information included in the initial microprogram load from loader 32. Next, the active time counter, a register in control store 42, is set to the length of time during which the maximum worst-case loading will be applied to the power supply system.

A bit in the microprogram control word is then interrogated to determine whether a single address is to be looped on or whether the address counter will be decremented. If a single address is to be accessed, the data pattern is stored, the active time counter is decremented and a compare is made for count equal to zero. This sequence is continued until the count is equal to zero at which time the active time is completed and inactive time is begun.

If, however, addresses are to be sequenced, the data pattern is stored in the location determined by the current address and the address counter is decremented. The active time counter is also decremented and a compare is made to determine whether the count equals zero. As before, the sequence is continued until the active time counter is zero at which time the active time is finished and the inactive time portion of the microprogram routine is begun.

During active time, the power test mode line 37 and line 39 shown in FIG. 1 are active allowing the voltage status information to be gated to the arithmetic logic unit and data flow 40 to determine whether any faults have occurred or whether any power supply means are not within specification. In the event of a fault, an indicator is set notifying the operator of a failure with an identifier indicating the functional unit at which the failure occurred.

Alternatively, the operator may select to have a permanent record of faults printed on an output printer or the operator may select to have a stop occur on error.

INACTIVE TIME

Local storage mode is set on and a branch is taken to local storage address zero. This causes the program to be executed from control words contained in local storage. During the inactive time, the power supply means are not exercised. The inactive time counter is set from console switches and decremented until the count equals zero. After the inactive time counter reaches zero, the local store mode is reset and a return is made to control storage for the next routine.

While the invention has been particularly shown and described with reference to a preferred embodiment thereof, it will be understood by those skilled in the art that various changes in form and detail may be made therein.

What is claimed is:

1. Apparatus for testing power supply means in a data processing system, comprising:
   a data processing system having a plurality of functional units, each said functional unit having one or more independent power supply means;
   means for operating said data processing system to exercise each of said plurality of functional units to cause a predetermined series of active power supply loading conditions followed by inactive power supply loading conditions to occur; and means connected to said data processing system and responsive to said active and inactive power supply loading conditions for determining the occurrence and location of faults.

2. Apparatus according to claim 1 wherein said means for operating said data processing system comprises:

microprogram control means for activating a maximum number of circuits in one of said functional units cyclically during one period of time to produce said active power supply loading conditions and for not activating said circuits during a succeeding period of time to produce said inactive power supply loading conditions, thereby to cause a worst-case power supply loading condition.

3. Apparatus according to claim 1 wherein said fault determining means further comprises monitor means for monitoring output characteristics of said power supply means, gating means for gating digital indications of said output characteristics and storage means for storing said digital indications.

4. Apparatus according to claim 3 wherein said monitor means further comprises:

filter means to separate a first alternating current output characteristic from a second output characteristic of said power supply means and level detecting means for generating a digital indication of error when either of said output characteristics exceed a predetermined threshold level.

5. Apparatus, for testing power supply means in a data processing system comprising:

microprogram control means for operating said data processing system to produce a series of active power supply loading conditions followed by inactive power supply loading conditions, thereby to cause said power supply means to be presented with a worst-case loading condition;

means connected to said power supply means for filtering a first alternating current component, produced by the active power supply loading conditions, from a second alternating current component, produced by the active and inactive power supply loading conditions, of an output of said power supply means;

threshold detecting means connected to said filter means for detecting the magnitude of said first and second alternating current components;

direct current threshold detector means for monitoring a direct current output characteristic of said power supply means; and storage means for storing digital indications from said threshold detecting means representative of the status of said power supply means.

* * * * *